United States Patent [19]

Crawford et al.

[11] Patent Number: 5,321,836

[45] Date of Patent: Jun. 14, 1994

[54] VIRTUAL MEMORY MANAGEMENT METHOD AND APPARATUS UTILIZING SEPARATE AND INDEPENDENT SEGMENTATION AND PAGING MECHANISM

[75] Inventors: John H. Crawford, Santa Clara; Paul S. Ries, San Jose, both of Calif.

[73] Assignee: Intel Corporation, Santa Clara, Calif.

[21] Appl. No.: 506,211

[22] Filed: Apr. 9, 1990

Related U.S. Application Data

[63] Continuation of Ser. No. 185,325, Apr. 19, 1988, Pat. No. 4,972,338, which is a continuation of Ser. No. 744,389, Jun. 13, 1985, abandoned.

[51] Int. Cl.$^5$ .............................................. G06F 12/10
[52] U.S. Cl. ..................................... 395/400; 395/425; 364/DIG. 1; 364/243; 364/243.4; 364/243.41; 364/256.3; 364/256.4; 364/256.5
[58] Field of Search ...................... 365/238.5; 395/400, 395/425, 800

[56] References Cited

U.S. PATENT DOCUMENTS

| | | | |
|---|---|---|---|
| 3,047,228 | 7/1962 | Bauer et al. | 364/700 |
| 3,292,152 | 12/1966 | Barton | 365/49 |
| 3,298,001 | 1/1967 | Couleur et al. | 395/425 |
| 3,303,477 | 2/1967 | Voight | 395/400 |
| 3,351,913 | 11/1967 | Pine | 395/425 |
| 3,370,274 | 2/1968 | Kettley et al. | 395/775 |
| 3,412,382 | 11/1968 | Couleur et al. | 395/400 |
| 3,425,039 | 1/1969 | Bahrs et al. | 395/425 |
| 3,437,998 | 4/1969 | Bennett et al. | 395/425 |
| 3,454,931 | 7/1969 | Bahrs et al. | 395/425 |
| 3,461,434 | 8/1969 | Barton et al. | 395/400 |
| 3,473,159 | 10/1969 | Cantrell et al. | 395/425 |
| 3,479,649 | 11/1969 | Bahrs et al. | 395/725 |
| 3,510,847 | 5/1970 | Carlson et al. | 395/400 |
| 3,521,240 | 7/1970 | Bahrs et al. | 395/425 |
| 3,525,080 | 8/1970 | Couleur et al. | 395/425 |
| 3,546,677 | 12/1970 | Barton et al. | 395/400 |
| 3,548,384 | 12/1970 | Barton et al. | 395/400 |
| 3,601,809 | 8/1971 | Gray et al. | 395/425 |
| 3,649,767 | 3/1972 | Muroga et al. | 379/279 |
| 3,748,653 | 7/1973 | Debruyne et al. | 365/200 |
| 3,761,902 | 9/1973 | Weinberger | 365/49 |
| 3,764,996 | 10/1973 | Ross | 395/425 |
| 3,786,427 | 1/1974 | Schmidt et al. | 395/425 |
| 3,787,813 | 1/1974 | Cole et al. | 395/400 |
| 3,818,460 | 6/1974 | Beard et al. | 395/400 |
| 3,839,706 | 10/1974 | Borchsenius | 395/400 |
| 3,891,974 | 6/1975 | Coulter et al. | 395/500 |
| 3,916,385 | 10/1975 | Parmar et al. | 395/425 |
| 3,938,096 | 2/1976 | Brown et al. | 395/400 |
| 3,950,730 | 4/1976 | Bienvenu et al. | 395/425 |
| 3,953,717 | 4/1976 | Rottier et al. | 371/17 |
| 4,060,849 | 11/1977 | Bienvenu et al. | 395/275 |
| 4,068,300 | 1/1978 | Bachman | 395/600 |
| 4,077,058 | 2/1978 | Appell et al. | 395/650 |
| 4,079,453 | 3/1978 | Dahl | 395/400 |
| 4,092,715 | 5/1978 | Scriver | 395/400 |
| 4,128,875 | 12/1978 | Thurber et al. | 395/425 |
| 4,145,734 | 3/1979 | Bienvenu et al. | 395/575 |
| 4,173,783 | 11/1979 | Couleur et al. | 395/275 |
| 4,177,510 | 12/1979 | Appell et al. | 395/425 |
| 4,279,014 | 7/1981 | Cassonnet et al. | 395/425 |
| 4,300,192 | 11/1981 | Couleur et al. | 395/425 |

(List continued on next page.)

FOREIGN PATENT DOCUMENTS 1209709  8/1986  Canada .

OTHER PUBLICATIONS

A. Brandwajn et al., "A Study of a Page-on-Demand System", Information Processing Letters, vol. 6, No. 4, Aug. 1977, pp. 125-132.

[57] ABSTRACT

Microprocessor architecture for an address translation unit which provides two levels of memory management is described. Segmentation registers and an associated segmentation table in main memory provide a first level of memory management which includes attribute bits used for protection, priority, etc. A page cache memory and an associated page directory and page table in main memory provide a second level of management with independent protection on a page level.

6 Claims, 8 Drawing Sheets

U.S. PATENT DOCUMENTS

| | | | |
|---|---|---|---|
| 4,356,549 | 10/1982 | Chueh | 395/400 |
| 4,369,494 | 1/1993 | Bienvenu et al. | 395/550 |
| 4,374,409 | 2/1983 | Bienvenu et al. | 395/650 |
| 4,376,297 | 3/1983 | Anderson et al. | 395/400 |
| 4,377,855 | 3/1983 | Lavi | 365/49 |
| 4,385,352 | 5/1983 | Bienvenu | 395/400 |
| 4,394,725 | 7/1983 | Bienvenu et al. | 395/375 |
| 4,395,757 | 7/1983 | Bienvenu et al. | 395/650 |
| 4,410,941 | 10/1983 | Barrow et al. | 395/400 |
| 4,432,053 | 2/1984 | Gaither et al. | 395/400 |
| 4,434,459 | 2/1984 | Holland et al. | 395/375 |
| 4,441,155 | 4/1984 | Fletcher et al. | 395/400 |
| 4,442,484 | 4/1984 | Childs, Jr. et al. | 395/425 |
| 4,447,878 | 5/1984 | Kinnie et al. | 395/325 |
| 4,449,184 | 5/1984 | Pohlman, III et al. | 395/250 |
| 4,458,310 | 7/1984 | Chang | 395/425 |
| 4,472,771 | 9/1984 | Bienvenu et al. | 395/325 |
| 4,523,301 | 6/1985 | Kadota et al. | 365/49 |
| 4,587,610 | 5/1986 | Rodman | 395/400 |
| 4,612,612 | 9/1986 | Woffinden et al. | 395/400 |
| 4,613,935 | 9/1986 | Couleur | 395/375 |
| 4,615,006 | 9/1986 | Hirano | 395/400 |
| 4,646,271 | 2/1987 | Uchiyama et al. | 365/49 |
| 4,654,777 | 3/1987 | Nakamura | 395/400 |
| 4,656,626 | 4/1987 | Yudichak et al. | 370/68 |
| 4,669,034 | 6/1987 | Kaplinsky | 395/400 |
| 4,669,043 | 5/1987 | Kaplinsky | 395/400 |
| 4,691,282 | 9/1987 | Kinoshita | 395/800 |
| 4,714,993 | 12/1987 | Livingston et al. | 395/425 |
| 4,758,951 | 7/1988 | Sznyter, III | 395/400 |
| 4,763,250 | 8/1988 | Keshlear et al. | 395/400 |
| 4,785,398 | 11/1988 | Joyce et al. | 395/425 |
| 4,847,748 | 7/1989 | Yamahata et al. | 395/375 |
| 4,926,316 | 5/1990 | Baker et al. | 395/425 |
| 4,933,835 | 6/1990 | Sachs et al. | 395/425 |
| 4,972,338 | 11/1990 | Crawford et al. | 395/400 |
| 5,173,872 | 12/1992 | Crawford et al. | 365/49 |

OTHER PUBLICATIONS

| | | |
|---|---|---|
| 0113240 | 12/1983 | European Pat. Off. . |
| 2337373 | 9/1979 | France . |
| 1055630 | 1/1967 | United Kingdom . |
| 1281387 | 7/1972 | United Kingdom . |
| 1360585 | 10/1972 | United Kingdom . |
| 1457423 | 12/1976 | United Kingdom . |
| 1498116 | 1/1978 | United Kingdom . |
| 1543736 | 4/1979 | United Kingdom . |
| 1595740 | 8/1981 | United Kingdom . |
| 2127994 | 6/1983 | United Kingdom . |

FOREIGN PATENT DOCUMENTS

Albin L. Vareha, et al., "Strategies for Structuring Two Level Memories in a Paging Environment", ACM, Second Symposium on Operating Systems Principles, Oct. 20–22, 1969, Princeton University, pp. 54–59.

R. W. O'Neill, "Experience Using a Time-shared Multi-programming System with Dynamic Address Relocation Hardware", AFIPS Conference Proceedings, vol. 30, 1967, Spring Joint Computer Conference, Apr. 18–20, Atlantic City, N.J., pp. 611–621.

W. W. Chu, et al., "Performance of Replacement Algorithms with Different Page Sizes", Computer, Nov. 1974, pp. 15–21.

E. Gelenbe, et al., "Page Size in Demand-Paging Systems", Acta Informatica 3, (1973), pp. 1–23.

A. Brandwajn, "A Model of a Time Sharing Virtual Memory System Solved Using Equivalence and Discomposition Methods", Acta Informatica, vol. 4 Fasc. 1 1974, pp. 11–47.

Kishor S. Trivedi, "A Performance-Comparison of Systems with and without Virtual Memory", Department of Computer Science, Duke University, Durham, N.C. 27706, C-S-1976-9, Jun. 1976.

Marc Badel, et al., "Adaptive Optimization of a Time--Sharing System's Performance", Proceedings of IEEE, vol. 63, No. 6, Jun. 1975, pp. 958–965.

F. J. Corbato, et al., "Introduction and Overview of the Multics Systems", Proceedings-Fall Joint Computer Conference-1965, pp. 185–196.

Jack B. Dennis, "Segmentation and the Design of Multiprogrammed Computer Systems", Journal of the Association of Computing Machinery, vol. 2, No. 4 (Oct., 1965), pp. 589–602.

Robert C. Daley, et al., "Virtual Memory, Processes, and Sharing in Multics", Communications of the ACM, vol. 11, No. 5, May 1968, pp. 306–312.

A. Bensoussan, et al., "The Multics Virtual Memory: Concepts and Design", Communications of the ACM, May 1972, vol. 15, No. 5, pp. 308–318.

Edmund L. Burke, et al., "Emulating a Honeywell 6180 Computer System", Mitre Corporation, AD 787 218, Jun. 1974, pp. 1–73.

L. Smith, "Architectures for Secure Computing Systems", Mitre Corporation, AD A009 221, Apr. 1975, pp. 1–62.

OTHER PUBLICATIONS

Stuart E. Madnick, "Storage Hierarchy Systems", Massachusetts Institute of Technology, Jun. 1972, pp. 1–155.

Arvind, "Models for the Comparison of Memory Management Algorithms", A Thesis Submitted to the Faculty of the Graduate School of the University of Minnesota, Oct., 1973, Dec. 1973, pp. 1–170.

C. Bron, "Allocation of Virtual Store in the T.H.E. Multiprogramming System", A.P.I.C. Studies in Data Processing, No. 9, Operating Systems Techniques, Proceedings of a Seminar held at Queen's University, Belfast, 1971, pp. 168–193.

Peter J. Denning, et al., "Multiprogramming Memory Management", Proceedings of the IEEE, vol. 63, No. 6, Jun. 1975, pp. 924–939.

B. Randell, et al., "Dynamic Storage Allocation Systems", Communications of the ACM, vol. 11, No. 5, May, 1968, pp. 295–305.

Edward A. Feustel, "On the Advantages of Tagged Architecture", IEEE Transactions on Computers, vol. C-22, No. 7, Jul. 1973, pp. 645–675.

A. Brandwajn, "A Model of a Virtual Memory System", Acta Informatica 6, (1976), pp. 365–386.

R. W. Doran, "Computer Architecture; A Structured Approach", A.P.I.C. Studies in Data Processing No. 15, 1979, pp. 144–145.

Andrew S. Tanenbaum, "A Method for Implementing Paged, Segmented Virtual Memories on Microprogammable Computers", ACM, Operating Systems Review, vol. 13, No. 2, Apr. 1979, pp. 26–32.

Charles Hoch, et al., "An Implementation of Capabilities on the PDP-11/45", ACM, Operating Systems Review, vol. 14, No. 3, Jul., 1980, pp. 22–31.

R. A. Hagan, et al., "A Virtual Memory System for the Hewlett Packard 2100A", Computer Architecture News, vol. 6, No. 5, Dec. 1977, pp. 5–13.

A. J. Herbert, "A New Protection Architecture for the Cambridge Capability Computer", ACM Operating Systems Review, vol. 12, No. 1, Jan., 1978, p. 24.

C. Mohan, "Survey of Recent Operating Systems Research, Designs and Implmentations", ACM, Operating Systems Review, vol. 12, No. 1, Jan., 1978, pp. 53–67, 79.

David K. Gifford, "Hardware Estimation of a Process' Primary Memory Requirements", Communications of the ACM, Sep. 1977, vol. 20, No. 9, pp. 655–663.

"Highlights of the Multics System", Honeywell Computer Journal, pp. 88–95.

S. H. Fuller, et al., "The C.mmp Multiprocessor", Department of Computer Science, Carnegie-Mellon University, AD-A142132, Oct. 27, 1978, pp. 1–28.

Grant J. Munsey, "APL Data: Virtual Workspaces and Shared Storage", pp. 6–10.

Khaled A. El-Ayat, et al., "The Intel 80386-Architectu and Implementation", IEEE Micro, Dec. 1985.

R. L. Mattson, et al., "Evaluation Techniques for Storage Hierarchies", No. 2, 1970, pp. 78–117.

Richard T. Bueschel, "Timesharing Today", Data Processing Magazine, Dec. 1968, pp. 18–20.

Arndt B. Bergh, et al., "Cost-Effective Hardware for a Compact Integrated Business Computer", Hewlett-Packard Journal, Jul. 1979, pp. 3–8.

J. K. Buckle, "The ICL 2900 Series", Macmillan Computer Science Series, 1978.

George Lyne, "Reliability Maintainability and Availability Analysis Tradeoff Tool", RADC-TR-75-149, In-house Report, Jun. 1975, pp. 1–19.

D. B. Yntema, "The Cambridge Project: Computer Methods for Analysis and Modeling of Complex Systems", Massachusetts Institute of Technology, AD-783 626, Feb. 1974, pp. 1–29.

Richard M. Dobkin, "An Investigation of Advanced--Programming Techniques", Technical Report No. RADC-TR-68-367, Oct. 1968, pp. 1–82.

Thomas Angell, "Modifications to Auxiliary Control Executive Processor", RADC-TR-69-211, Computer Command and Control Company, Jul. 1969, pp. 1–30.

K. D. Ryder, "Module Packing in a Virtual Memory Environment", IBM Technical Disclosure Bulletin, vol. 18, No. 8, Jan. 1976, pp. 2586–2587.

Joseph M. Zeno, "A Simplied Cardin Subsystem for Gecos III", Pharos Systems Incorporated, Apr. 1970–Apr. 1971, pp. 1–142.

Alan J. Smith, "Sequential Program Prefetching in Memory Hierarchies", IEEE, Dec. 1978, pp. 7–21.

OTHER PUBLICATIONS

H. A. Anderson, Jr., "Least Likely to be Serviced Page Replacement Algorithm", IBM Technical Disclosure Bulletin, vol. 18, No. 7, Dec. 1975, pp. 2378–2380.

F. J. Aichelmann, et al., "Automatic Memory Select During I-Fetch Operations", IBM Technical Disclosure Bulletin, vol. 18, No. 11, Apr. 1976, pp. 3705–3706.

F. J. Aichelmann, et al., "Addressing Mechanism for Engine and Memory Operations", IBM Technical Disclosure Bulletin, vol. 18, No. 11, Apr. 1976, pp. 3715–3716.

R. W. Doran, "Virtual Memory", Computer, Oct. 1976, pp. 27–36.

K. B. Henningan "Hardware Subverter for the Honeywell 6180", ESD-TR-76-352, MTR-3280, Dec. 1976, pp. 1–222.

E. F. Dumstorff, et al., "Memory Page Address Override", IBM Technical Disclosure Bulletin, vol. 18, No. 9, Feb. 1976, pp. 3009–3010.

R. D. Tennison, et al., "Memory Space Mapping Using Virtual Addressing to Multiple-Sized Memory", IBM Technical Disclosure Bulletin, vol. 18, No. 3, Aug. 1975, pp. 619–621.

Z80,000 CPU Preliminary Product Specification, Zilog Corporation, Sep., 1983.

*Primary Examiner*—Paul V. Kulik
*Attorney, Agent, or Firm*—Blakely, Sokoloff, Taylor & Zafman

VIRTUAL MEMORY MANAGEMENT METHOD AND APPARATUS UTILIZING SEPARATE AND INDEPENDENT SEGMENTATION AND PAGING MECHANISM

This is a continuation of application Ser. No. 185,325, filed Apr. 19, 1982, now U.S. Pat. No. 4,972,338 which is a continuation of Ser. No. 744,389, filed on Jun. 13, 1985 now abandoned.

BACKGROUND OF THE INVENTION

1. Field of the Invention

The invention relates to the field of address translation units for memory management, particularly in a microprocessor system.

2. Prior Art

There are many well-known mechanisms for memory management. In some systems, a larger address (virtual address) is translated to a smaller physical address. In others, a smaller address is used to access a larger memory space, for instance, by using bank switching. The present invention relates to the former category, that is, where larger virtual address is used to access a limited physical memory.

In memory management systems, it is also known to provide various protection mechanisms. For example, a system may prevent a user from writing into an operating system for perhaps even from reading the operating system to external ports. As will be seen, the present invention implements a protection mechanism as part of a broader control scheme which assigns "attributes" to data on two distinct levels.

The closest prior art known to Applicant is that described in U.S. Pat. No. 4,442,484. This patent describes the memory management and protection mechanism embodied in a commercially available microprocessor, the Intel 286. This microprocessor includes segmentation descriptor registers containing segment base addresses, limit information and attributes (e.g., protection bits). The segment descriptor table and the segment descriptor registers both contain bits defining various control mechanisms such as privilege level, types of protection, etc. These control mechanisms are described in detail in U.S. Pat. No. 4,442,484.

One problem with the Intel 286 is that the segment offset is limited to 64k bytes. It also required consecutive locations in physical memory for a segment which is not always easy to maintain. As will be seen, one advantage to the inverted system is that the segment offset is as large as the physical address space. Yet, the invented system still provides compatibility with the prior segmentation mechanism found in the Intel 286. Other advantages and distinctions between the prior art system discussed in the above-mentioned patent and its commercial realization (Intel 286 microprocessor) will be apparent from the detailed description of the present invention.

SUMMARY OF THE INVENTION

An improvement to a microprocessor system which includes a microprocessor and a data memory is described. The microprocessor includes a segmentation mechanisms for translating a virtual memory address to a second memory address (linear address) and for testing and controlling attributes of data memory segments. The improvement of the present invention includes a page cache memory on the microprocessor for translating a first field from the linear address for a hit or match condition. The data memory also stores page mapping data, specifically, a page directory and a page table. The first field accesses the page directory and page table if no hit occurs in the page cache memory. The output from either the page cache memory or the page table provide a physical base address for a page in memory. Another field of the linear address provides an offset within the page.

Both the page cache memory and page mapping data in the data memory store signals representing attributes of the data in a particular page. These attributes include read and write protection, indicate whether the page has been previously written into, and other information. Importantly, the page level protection provides a second tier of control over data in the memory which is separate and distinguished from the segment attributes.

DETAILED DESCRIPTION OF THE PRESENT INVENTION

A microprocessor system and in particular, a memory management mechanism for the system is described. In the following description, numerous specific details are set forth such as specific number of bits, etc., in order to provide a thorough understanding of the present invention. It will be obvious, however, to one skilled in the art that the present invention may be practiced without these specific details. In other instances, well-known structures are not shown in detail in order not to unnecessarily obscure the present invention.

Figure 1:
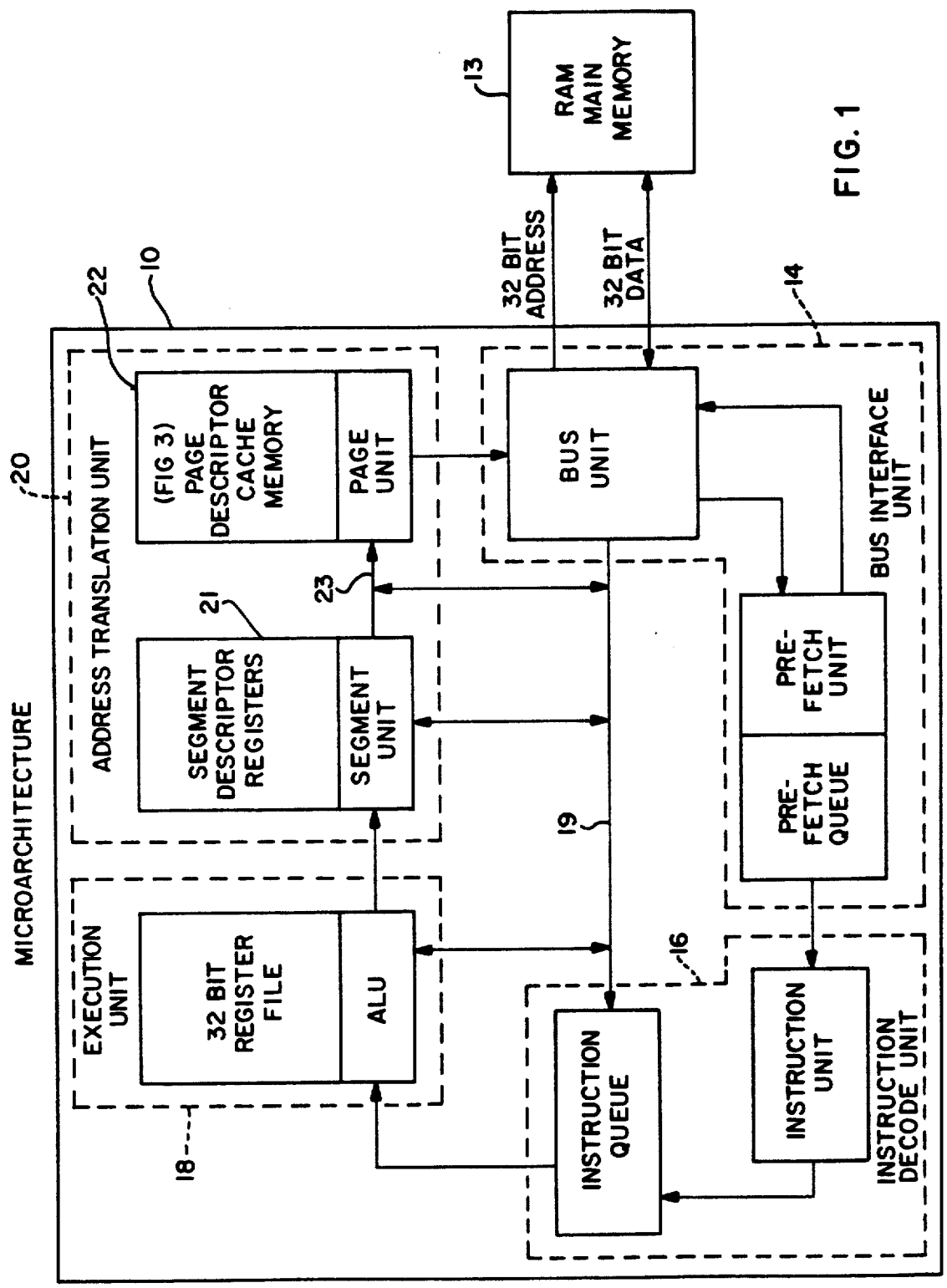
FIG. 1 is a block diagram showing the overall architecture of the microprocessor in which the present invention is currently realized.

In its currently preferred embodiment, the microprocessor system includes the microprocessor 10 of FIG. 1. This microprocessor is fabricated on a single silicon substrate using complementary metal-oxide-semiconductor (CMOS) processing. Any one of many well-known CMOS processes may be employed, moreover, it will be obvious that the present invention may be realized with other technologies, for instance, n-channel, bipolar, SOS, etc.

The memory management mechanism for some conditions requires access to tables stored in main memory. A random-access memory (RAM) 13 which functions as the main memory for the system is shown in FIG. 1.

An ordinary RAM may be used such as one employing dynamic memories.

As shown in FIG. 1, the microprocessor 10 has a physical address of 32 bits, and the processor itself is a 32-bit processor. Other components of a microprocessor system commonly used such as drivers, mathematical processors, etc. are not shown in FIG. 1.

HIGHLIGHT OF INVENTION

The invented memory management makes use of both segmentation and paging. Segments are defined by a set of segment descriptor tables that are separate from the page tables used to described the page translation. The two mechanisms are completely separate and independent. A virtual address is translated to a physical address in two distinct steps, using two distinct mapping mechanisms. A segmentation technique is used for the first translation step, and a paging techniques is used for the second translation step. The paging translation can be turned off to produce a one-step translation with segmentation only, which is compatible with the 286.

Segmentation (the first translation) translates a 48-bit virtual address to a 32-bit linear (intermediate) address. The 48-bit virtual address is composed of a 16-bit segment selector, and a 32-bit offset within this segment. The 16-bit segment selector identifies the segment, and is used to access an entry from the segment descriptor table. This segment descriptor entry contains a base address of the segment, the size (limit) of the segment, and various attributes of the segment. The translation steps adds the segment base to the 32-bit offset in the virtual address to obtain a 32-bit linear address. At the same time, the 32-bit offset in the virtual address is compared against the segment limit, and the type of the access is checked against the segment attributes. A fault is generated and the addressing process is aborted, if the 32-bit offset is outside the segment limit, or if the type of the access is not allowed by the segment attributes.

Paging (the second translation) translates a 32-bit linear address to a 32-bit physical address using a two-level paging table, in a process described in detail below.

The two steps are totally independent. This permits a (large) segment to be composed of several pages, or a page to be composed of several (small) segments.

A segment can start on any boundary, and be of arbitrary size, and is not limited to starting on a page boundary, or to have a length that is an exact multiple of pages. This allows segments to describe separately protected areas of memory that start at arbitrary addresses and to be of arbitrary size.

Segmentation can be used to cluster a number of small segments, each with its unique protection attributes and size, into a single page. In this case, segmentation provides the protection attributes, and paging provides a convenient method of physical memory mapping a group of related units that must be protected separately.

Paging can be used to break up very large segments into small units for physical memory management. This provides a single identifier (the segment selector), and a single descriptor (the segment descriptor) for a separately protected unit of memory, rather than requiring the use of a multitude of page descriptors. Within a segment, paging provides an additional level of mapping that allows large segments to be mapped into separate pages that need not be contiguous in physical memory. In fact, paging allows a large segment to be mapped so that only a few pages at a time are resident in physical memory, with the remaining pars of the segment mapped onto disk. Paging also supports the definition of sub-structure within a large segment, for example, to write protect some pages of a large segment, while other pages can be written into.

Segmentation provides a very comprehensive protection model which works on the "natural" units used by a programmer: arbitrary sized pieces of linearly addressed memory. Paging provides the most convenient method for managing physical memory, both systems main memory and backing disk memory. The combination of the two methods in the present invention provides a very flexible and powerful memory protection model.

OVERALL MICROPROCESSOR ARCHITECTURE

In FIG. 1, the microprocessor includes a bus interface unit 14. The bus unit includes buffers for permitting transmissions of the 32-bit address signals and for receiving and sending the 32 bits of data. Internal to the microprocessor, unit 14 communicates over the internal bus 19. The bus unit includes a pre-fetch unit for fetching instructions from the RAM 12 and a pre-fetch queue which communicates with the instruction unit of the instruction decode unit 16. The queued instructions are processed within the execution unit 18 (arithmetic logic unit) which includes a 32-bit register file. This unit, as well as the decode unit, communicate with the internal bus 19.

The present invention centers around the address translation unit 20. This unit provides two functions; one associated with the segment descriptor registers, and the other with the page descriptor cache memory. The segment registers are for the most part known in the prior art; even so, they are described in more detail in conjunction with FIG. 2. The page cache memory and its interaction with the page directory and page table stored within the main memory 13 is discussed in conjunction with FIGS 3–7 and forms the basis for the present invention.

SEGMENTATION MECHANISM

The segmentation unit of FIG. 1 receives a virtual address from the execution unit 18 and accesses the appropriate register segmentation information. The register contains the segment base address which along with the offset from the virtual address are coupled over lines 23 to the page unit.

Figure 2:
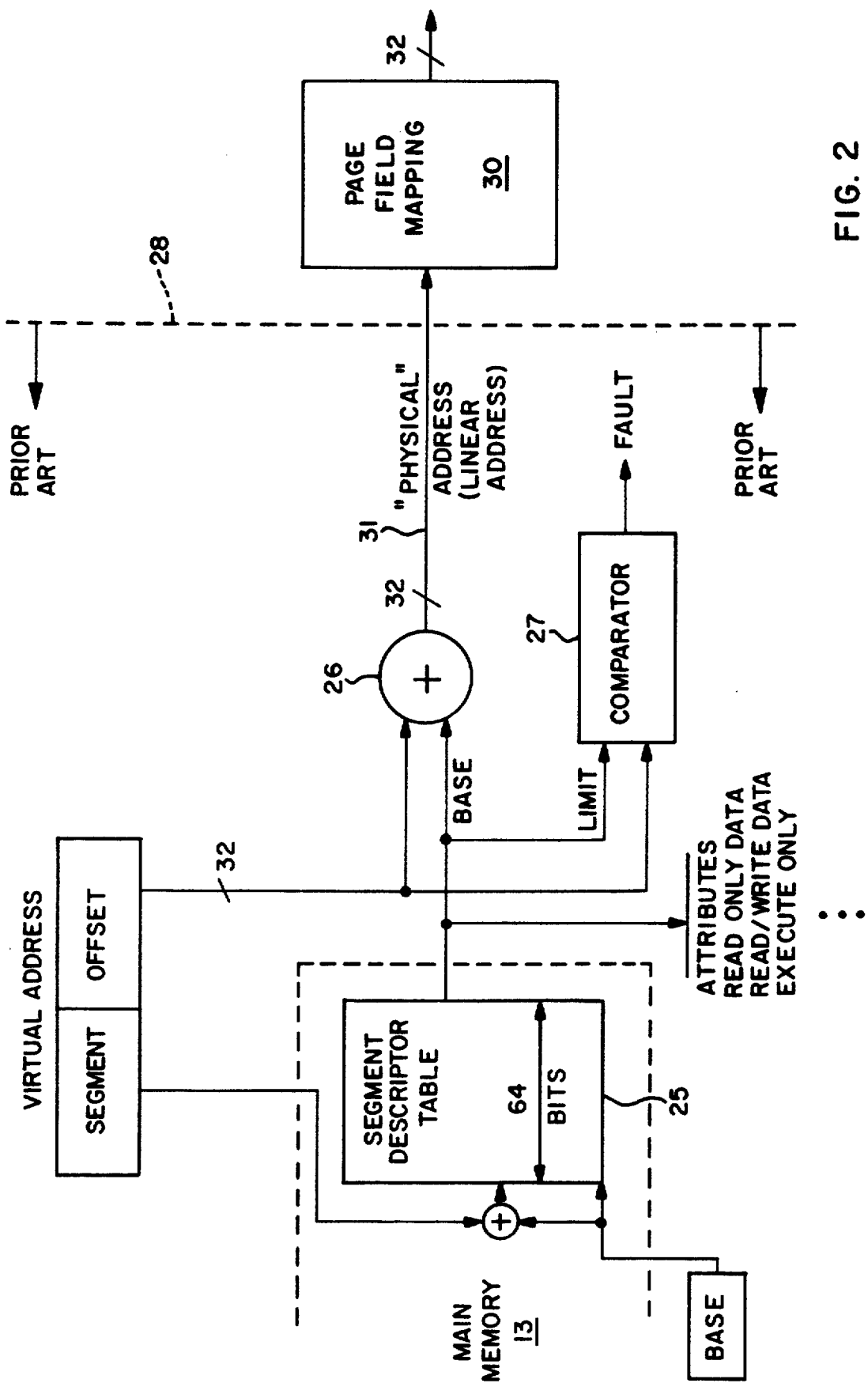
FIG. 2 is a block diagram illustrating the segmentation mechanisms embodied in the microprocessor of FIG. 1.

FIG. 2 illustrates the accessing of the tables in main memory when the segmentation registers are loaded with mapping information for a new segment. The segment field indexes the segment descriptor table in the main memory 13. The contents of the table provide a base address and additionally, provide attributes associated with the data in the segment. The bas address and offset are compared to the segment limits in comparator 27; the output of this comparator providing a fault signal. The adder 28 which is part of the microprocessor combines the base and offset to provide a "physical" address on lines 31. This address may be used by the microprocessor as a physical address or used by the paging unit. This is done to provide compatibility with certain programs written for a prior microprocessor (Intel 286). For the Intel 286, the physical address space is 24 bits.

The segment attributes including details on the descriptors employed such as the various privilege levels are set forth in U.S. Pat. No. 4,442,484.

The fact that the segmentation mechanism is known in the prior art is represented in FIG. 2 by the dotted line 28 which indicates the prior art structures to the left of the dotted line.

The page field mapping block 30 which includes the page unit of FIG. 1 as well as its interaction with the page directory and page table stored in the main memory is shown in FIGS. 3 through 7.

While in the currently preferred embodiment the segmentation mechanism uses shadow registers, it also could be implemented with a cache memory as is done with the paging mechanism.

PAGE DESCRIPTOR CACHE MEMORY

Figure 3:
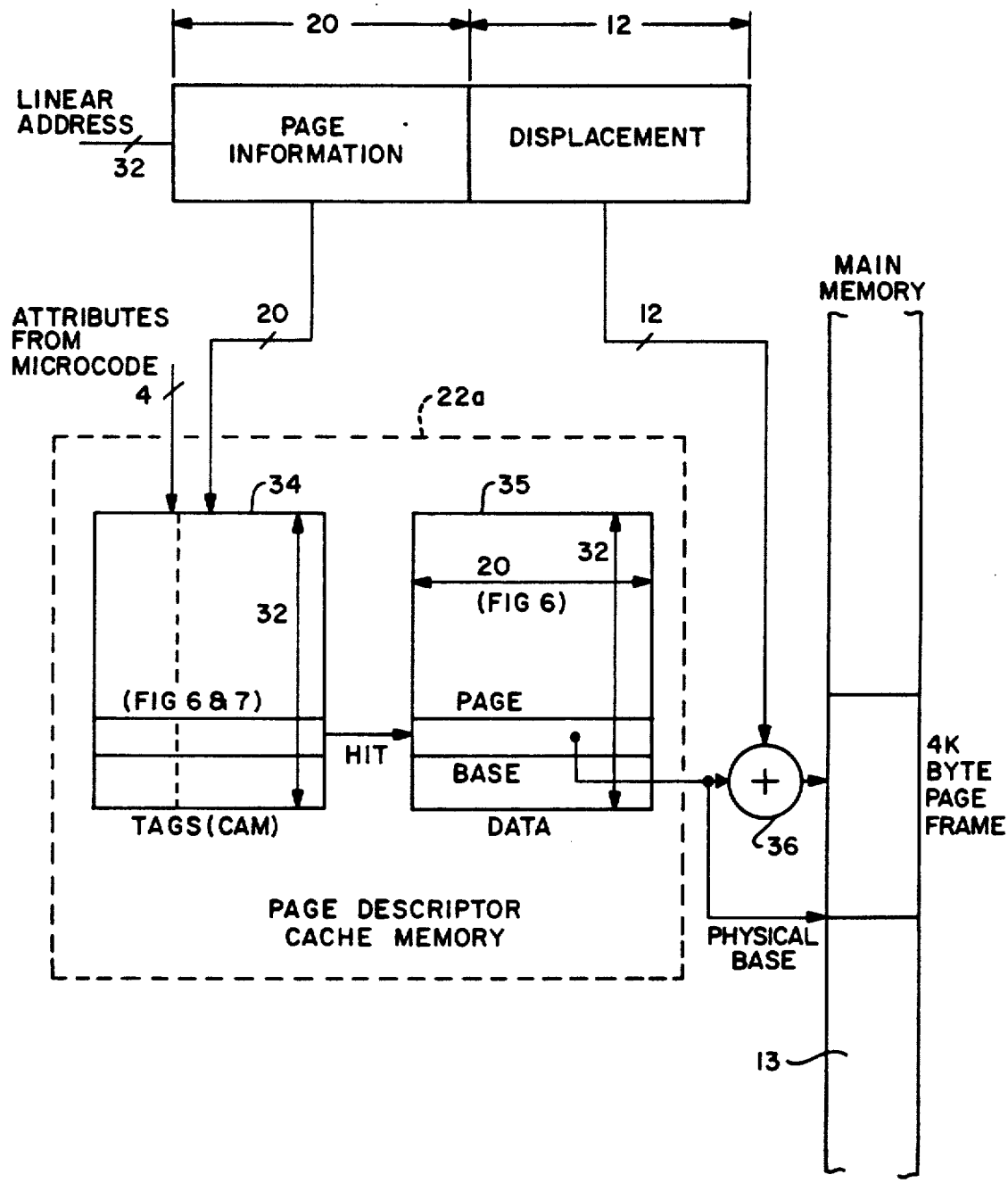
FIG. 3 is a block diagram illustrating the page field mapping for a hit or match in the page cache memory.

In FIG. 3 the page descriptor cache memory of the page unit 22 of FIG. 1 is shown within dotted line 22a. This memory comprises two arrays, a content addressable memory (CAM) 34 and a page data (base) memory 35. Both memories are implemented with static memory cells. The organization of memories 34 and 35 is described in conjunction with FIG. 6. The specific circuitry used for CAM 34 with its unique masking feature is described in conjunction with FIGS. 7 and 8.

The linear address from the segment unit 21 are coupled to the page unit 22 of FIG. 1. As shown in FIG. 3, this linear address comprises two fields, the page information field (20 bits) and a displacement field (12 bits). Additionally, there is a four bit page attribute field provided by the microcode. The 20-bit page information field is compared with the contents of the CAM 34. Also, the four attribute bits ("dirty", "valid", "U/S", and "W/R") must also match those in the CAM before a hit occurs. (There is an exception to this when "masking" is used as will be discussed.)

For a hit condition, the memory 35 provides a 20-bit base word which is combined with the 12-bit displacement field of the linear address as represented by summer 36 of FIG. 3 and the resultant physical address selects from a 4k byte page frame in main memory 13.

PAGE ADDRESSING FOR THE NO-HIT CONDITION

Figure 4:
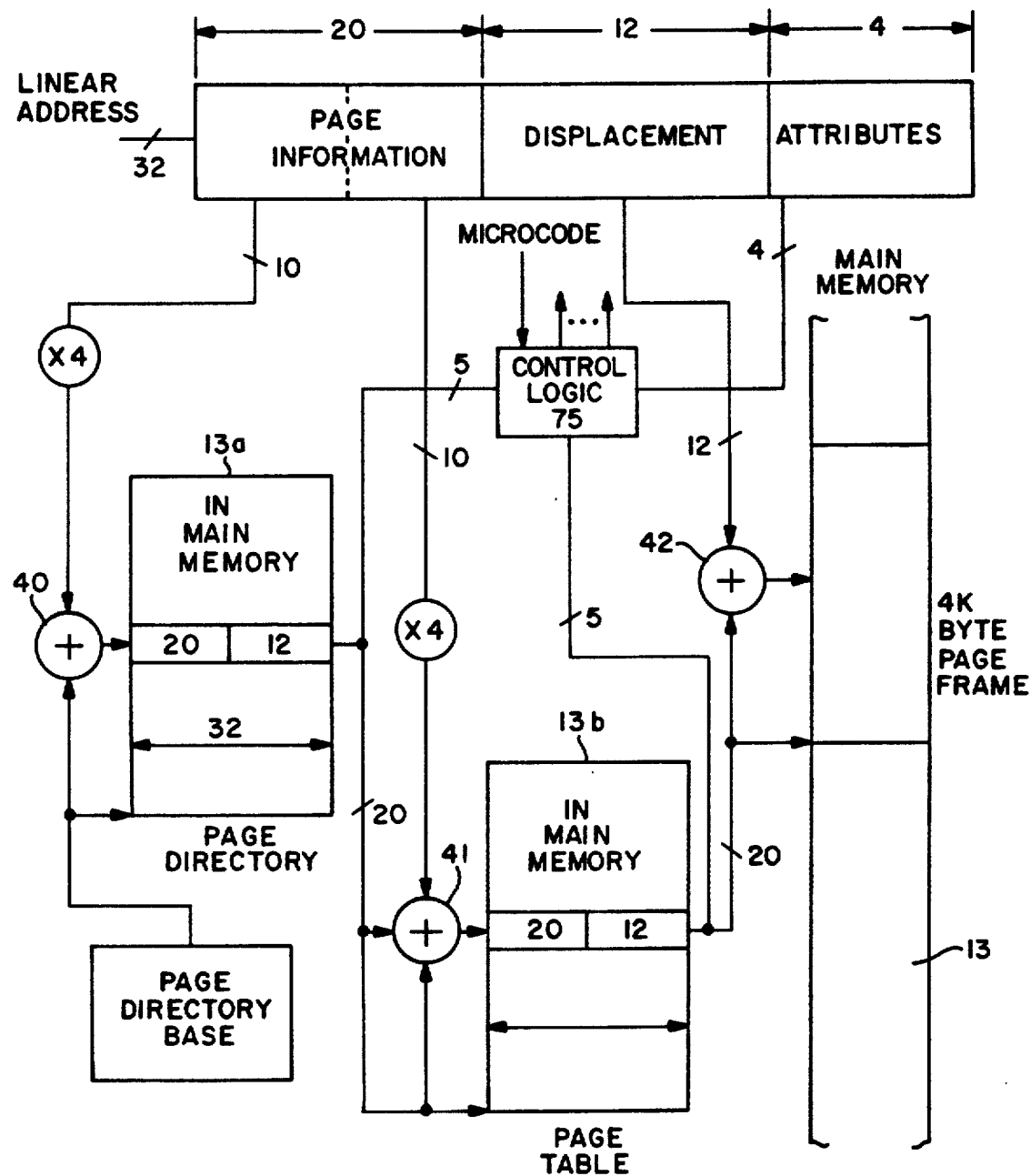
FIG. 4 is a block diagram illustrating the page field mapping for no hit or match in the page cache memory of FIG. 3. For this condition, the page directory and page table in main memory are used and, hence, are shown in FIG. 4.

A page directory 13a and a page table 13b are stored in the main memory 13 (see FIG. 4). The base address for the page directory is provided from the microprocessor and is shown in FIG. 4 as the page directory base 38. Ten bits of the page information field are used as an index (after being scaled by a factor of 4) into the page directory as indicated by the summer 40 in FIG. 4. The page directory provides a 32-bit word. Twenty bits of this word are used as a base for the page table. The other 10 bits of the page information field are similarly used as an index (again being scaled by a factor of 4) into the page table as indicated by the summer 41. The page table also provides a 32-bit word, 20 bits of which are the page base of the physical address. This page base address is combined as indicated by summer 42 with the 12-bit displacement field to provide a 32-bit physical address.

Five bits from the 12-bit fields of the page directory and table are used for attributes particularly "dirty", "access", "U/S", "R/W" and "present . These will be discussed in more detail in conjunction with FIG. 5. Remaining bits of this fields are unassigned.

The stored attributes from the page directory and table are coupled to control logic circuit 75 along with the 4 bits of attribute information associated with the linear address. Parts of this logic circuit are shown in subsequent figures are discussed in conjunction with these figures.

PAGE DIRECTORY ATTRIBUTES

Figure 5:
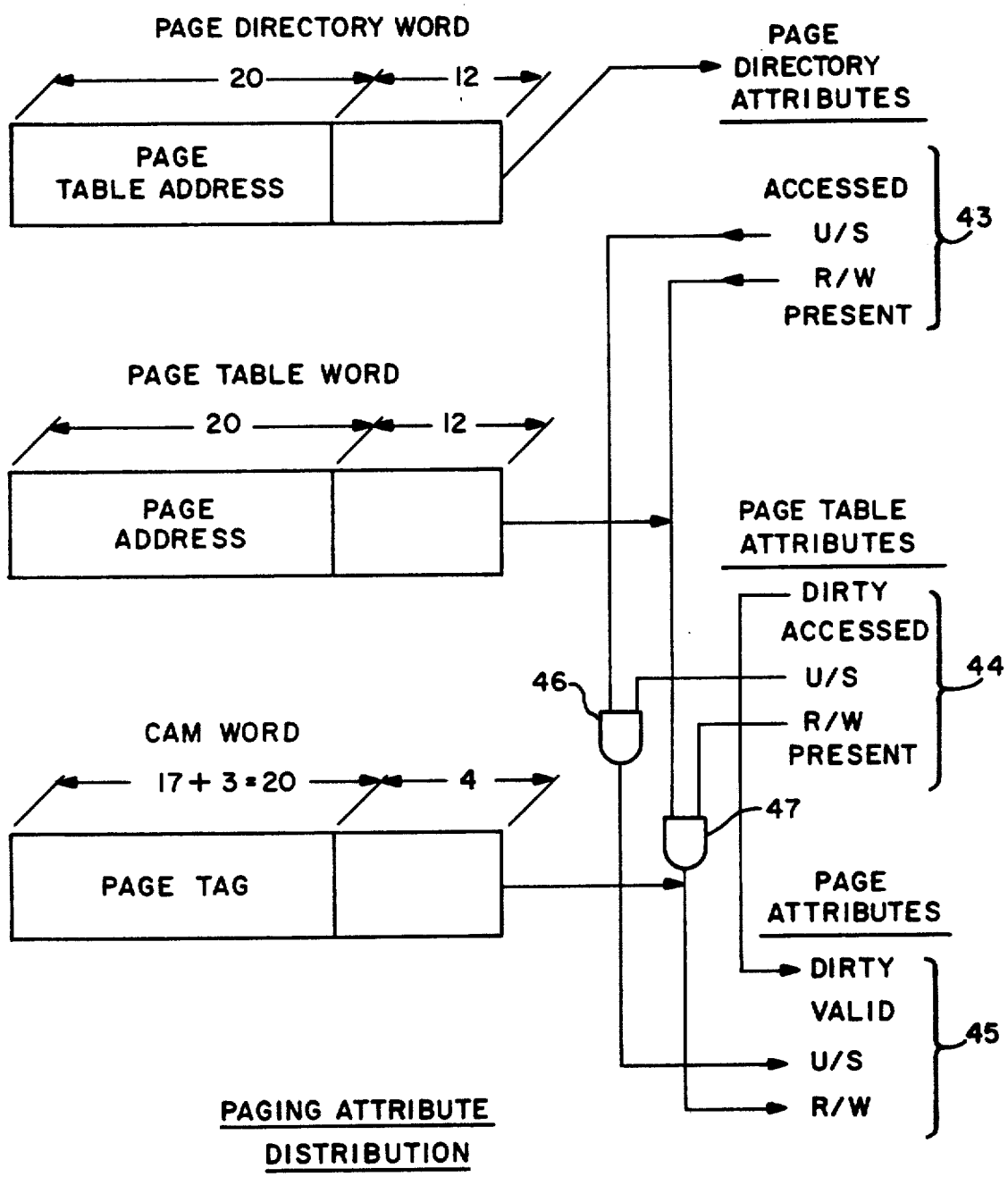
FIG. 5 is a diagram used to illustrate the attributes stored in the page directory, page table page cache memory.

In FIG. 5 the page directory word, page table word and CAM word are again shown. The protective/control attributes assigned to the four bits of the page directory word are listed within bracket 43. The same four attributes with one additional attribute are used for the page table word and are set forth within bracket 44. The four attributes used for the CAM word are set forth within bracket 45.

The attributes are used for the following purpose:

1. DIRTY. This bit indicates whether a page has been written into. The bit is changed once a page has been written into. This bit is used, for instance, to inform the operating system that an entire page is not "clean". This bit is stored in the page table and in the CAM (not in the page directory). The processor sets this bit in the page table when a page is written into.

2. ACCESSED. This bit is stored in only the page directory and table (not in the CAM) and is used to indicate that a page has been accessed. Once a page is accessed, this bit is changed in the memory by the processor. Unlike the dirty bit, this bit indicates whether a page has been accessed either for writing or reading.

3. U/S. The state of this bit indicates whether the contents of the pager is used and supervisory accessible (binary 1) or supervisor only (binary zero).

4. R/W. Tis read/write protection bit must be a binary 1 to allow the page to be written into by a user level program.

5. PRESENT. This bit in the page table indicates if the associated page is present in the physical memory. This bit in the page directory indicates if the associated page table is present in physical memory.

6. VALID. This bit which is stored only in the CAM is used to indicate if the contents of the CAM is valid. This bit is set to a first state on initialization then changed when a valid CAM word is loaded.

The five bits from the page directory and table are coupled to control logic circuit 75 to provide appropriate fault signals within the microprocessor.

The user/supervisor bits from the page directory and table are logically ANDed as indicated by gate 46 to provide the R/W bit stored in the CAM 34 of FIG. 3. Similarly, the read/write bits from the page directory and tables are logically ANDed through gate 47 to provide the W/R bit stored in the CAM. The dirty bit from the page table is stored in the CAM. These gates are part of the control logic 75 of FIG. 4.

The attributes stored in the CAM are "automatically" tested since they are treated as part of the address and matched against the four bits from the microcode. A fault condition results even if a valid page base is stored in the CAM, if, for instance, the linear address indicates that a "user" write cycle is to occur into a page with R/W=0.

The ANDing of the U/S bits from the page directory and table ensures that the "worst case" is stored in the cache memory. Similarly, the ANDing of the R/W bit provides the worst case for the cache memory.

ORGANIZATION OF THE PAGE DESCRIPTOR CACHE MEMORY

Figure 6:
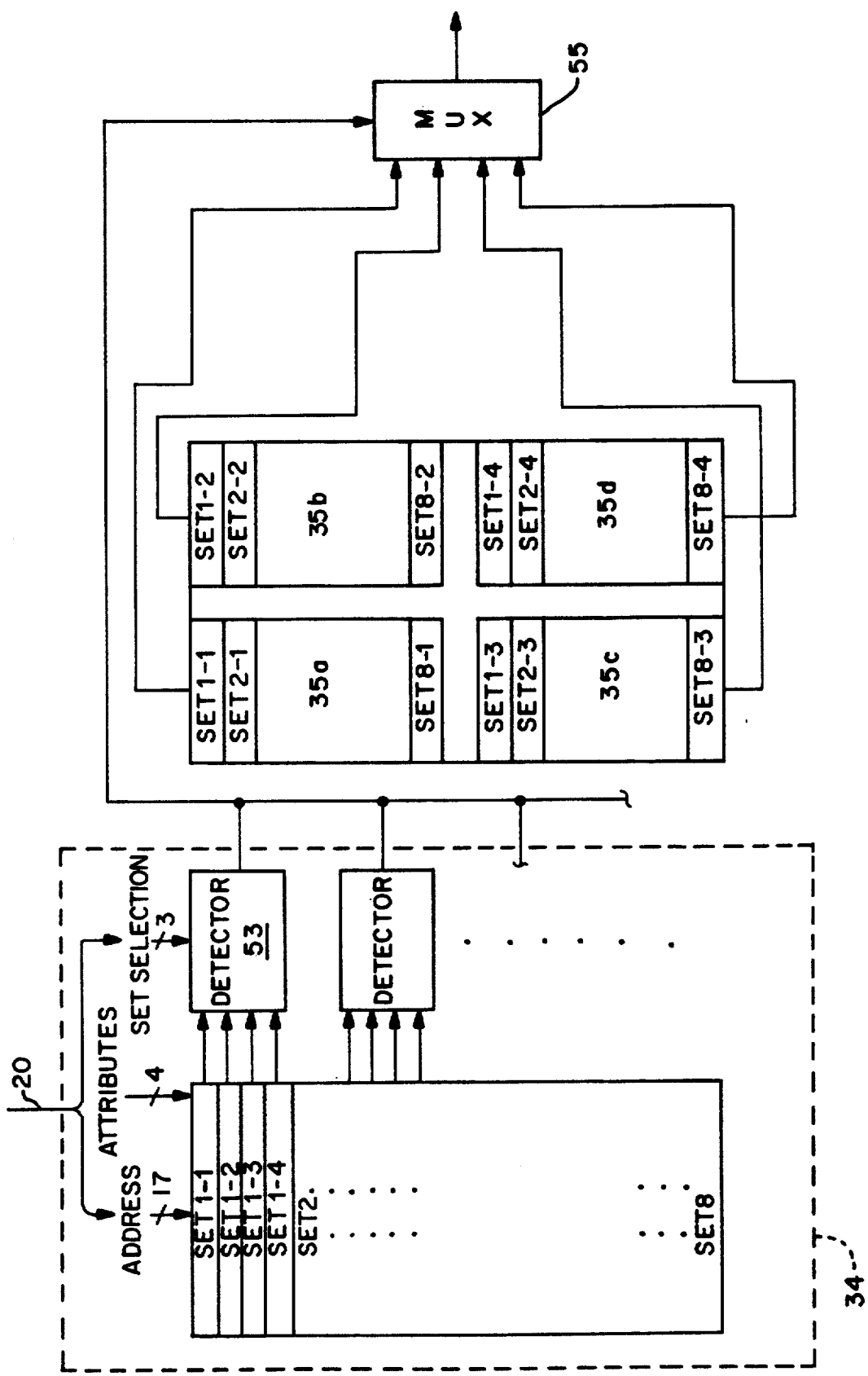
FIG. 6 is a block diagram illustrating the organization of the content addressable memory and data storage contained within the page cache memory.

The CAM 34 as shown in FIG. 6 is organized in 8 sets with 4 words in each set. Twenty-one bits (17 address and 4 attributes) are used to find a match in this array. The four comparator lines from the four stored words in each set are connected to a detector. For instance, the comparator lines for the four words of set 1 are connected to detector 53. Similarly, the comparator lines for the four words in sets 2 through 8 are connected to detectors. The comparator lines are sensed by the detectors to determine which word in the set matches the input (21 bits) to the CAM array. Each of the detectors contains "hard wired" logic which permits selection of one of the detectors depending upon the state of the 3 bits from the 20-bit page information field coupled to the detectors. (Note the other 17 bits of this bit page information field is coupled to the CAM array.)

Figure 8:
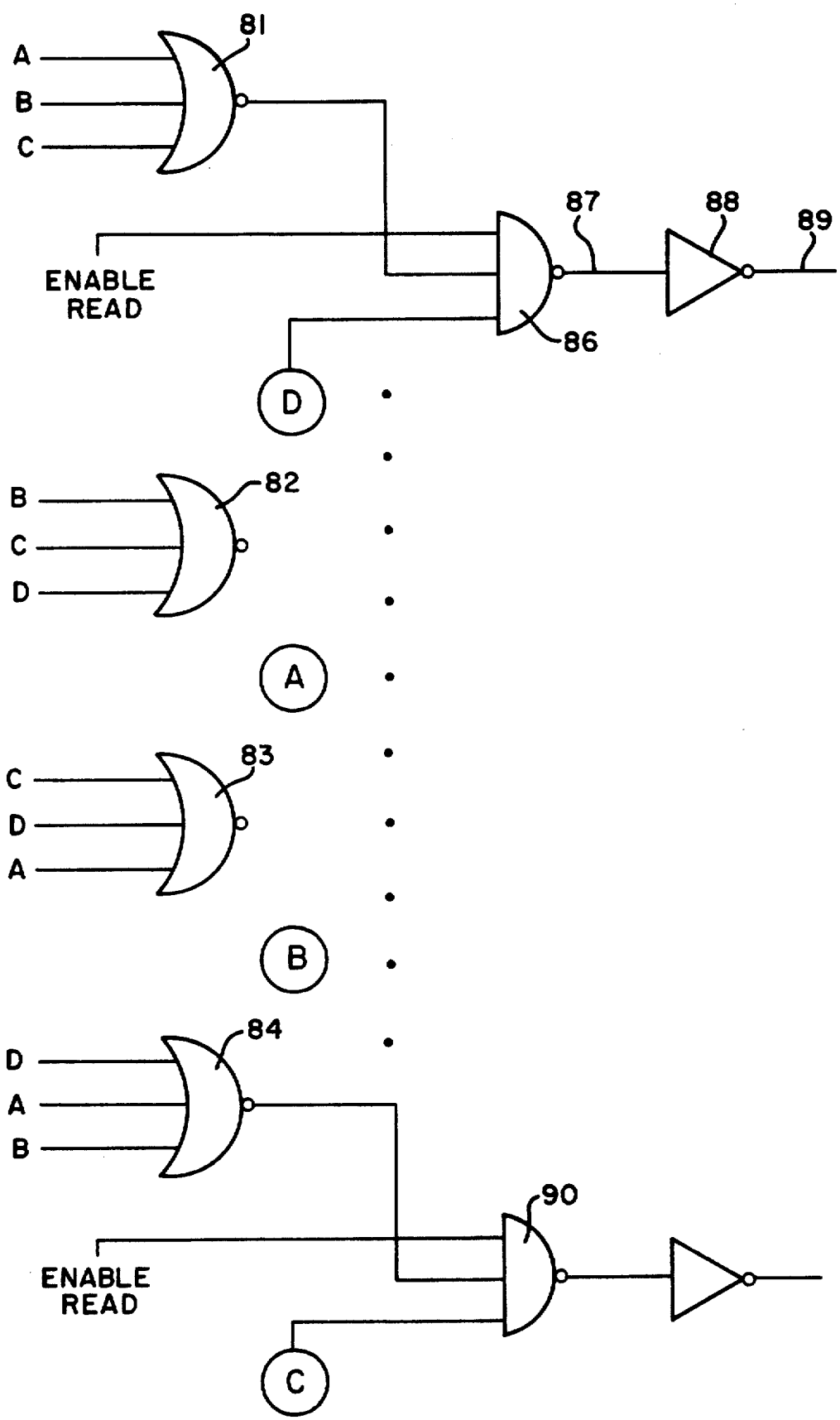
FIG. 8 is an electrical schematic of the logic circuits associated with the detector of FIG. 6.

For purposes of explanation, eight detectors are implied from FIG. 6. In the current embodiment only one detector is used with the three bits selecting one set of four lines for coupling to the detector. The detector itself is shown in FIG. 8.

The data storage portion of the cache memory is organized into four arrays shown as arrays 35a–d. The data words corresponding to each set of the CAM are distributed with one word being stored in each of the four arrays. For instance, the data word (base address) selected by a hit with word 1 of set 1 is in array 35a, the data word selected by a hit with word 2 of set 1 is in array 35b, etc. The three bits used to select a detector are also used to select a word in each of the arrays. Thus, simultaneously, words are selected from each of the four arrays. The final selection of a word from the arrays is done through the multiplexer 55. This multiplexer is controlled by the four comparator lines in the detector.

When the memory cache is accessed, the matching process which is a relatively slow process begins through use of the 21 bits. The other three bits are able to immediately select a set of four lines and the detector is prepared for sensing a drop in potential on the comparator lines. (As will be discussed, all the comparator (rows) lines are precharged with the selected (hit) line remaining charged while the non-selected lines discharge.) Simultaneously, four words from the selected set are accessed in arrays 35a-35d. If and when a match occurs, the detector is able to identify the word within the set and this information is transmitted to the multiplexer 55 allowing the selection of the data word. This organization improves access time in the cache memory.

CONTENT ADDRESSABLE MEMORY (CAM)

Figure 7:
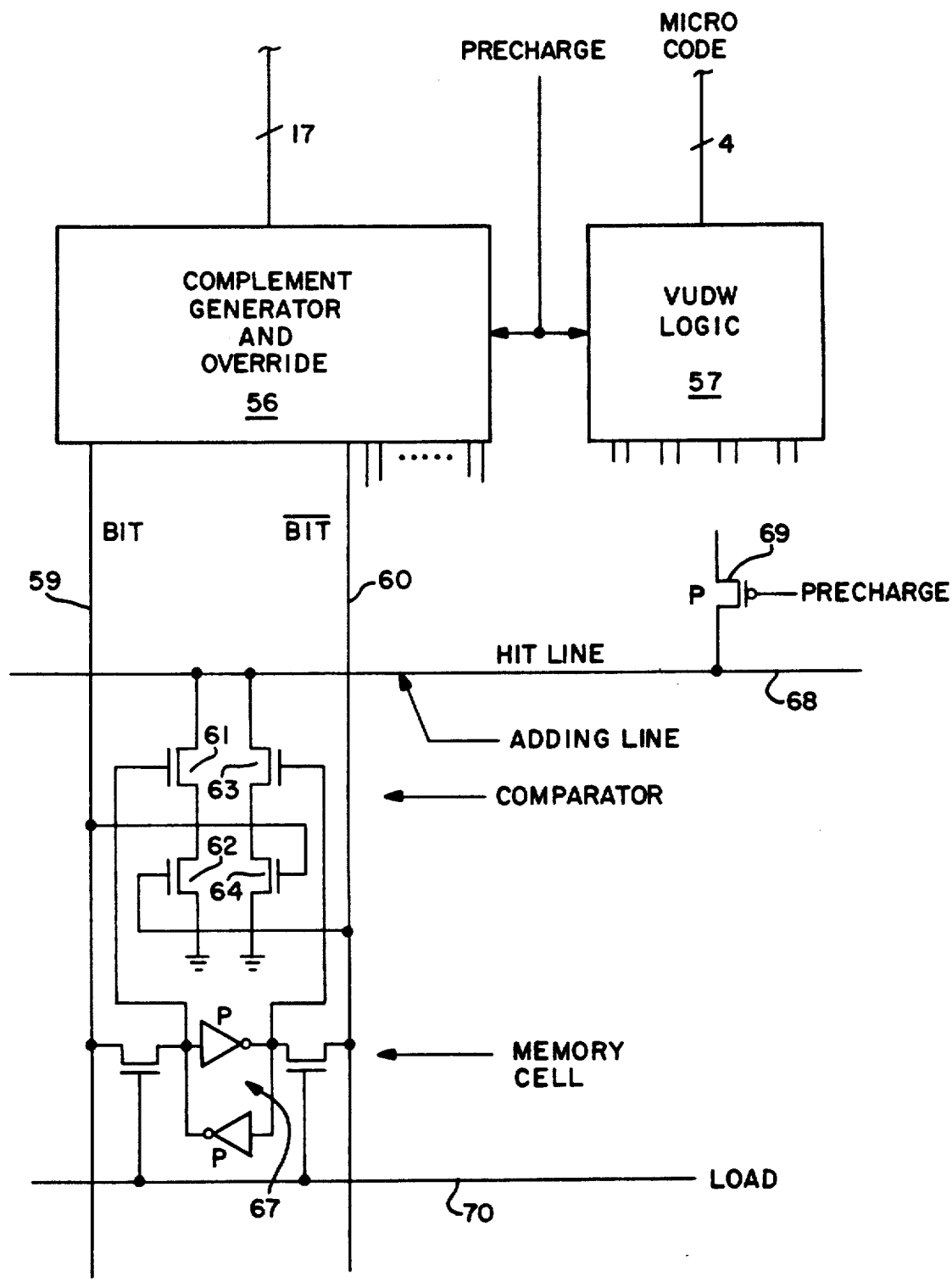
FIG. 7 is an electrical schematic of a portion of the content addressable memory of FIG. 6.

In FIG. 7, the 21 bits which are coupled to the CAM array are again shown with 17 of the bits being coupled to the complement generator and override circuit 56 and with the 4 attribute bits coupled to the VUDW logic circuit 57. The 3 bits associated with the selection of the detectors described in conjunction with FIG. 6 are not shown in FIG. 7.

The circuit 56 generates the true and complement signal for each of the address signals and couples them to parallel lines in the CAM array, such as lines 59 and 60. Similarly, the VUDW logic 57 generates both the true and complement signals for the attribute bits and coupled them to parallel lines in the array. The lines 59 and 60 are duplicated for each of the true and complement bit lines (i.e., 21 pairs of bit and bit/lines).

Each of the 32 rows in the CAM array has a pair of parallel row lines such as lines 68 and 70. An ordinary static memory cell such as cell 67 is coupled between each of the bit and bit/lines (columns) and is associated with the pair of row lines. In the presently preferred embodiment, the memory cells comprise ordinary flip-flop static cells using p-channel transistors. One line of each pair of row lines (line 70) permits the memory cell to be coupled to the bit and bit/line when data is written into the array. Otherwise, the content of the memory cell is compared to the data on the column lines and the results of the comparison is coupled to the hit line 68. The comparison is done by comparators, one associated with each cell. The comparator comprises the n-channel transistors 61–64. Each pair of the comparator transistors, for example, transistors 61 and 62, are coupled between one side of the memory cell and the opposite bit line.

Assume that data is stored in the memory cell 67 and that the node of the cell closest to bit line 59 is high. When the contents of the CAM are examined, first the bit line 68 is precharged through transistor 69. Then the signals coupled to the CAM are placed on the column lines. Assume first that line 59 is high. Transistor 62 does not conduct since line 60 is low. Transistor 63 does not conduct since the side of the cell to which it is connected is low. For these conditions, line 68 is not discharged, indicating that a match has occurred in the cell. The hit line 68 provides ANDing of the comparisons occurring along the row. If a match does not occur, one or more of the comparators will cause the hit line to discharge.

During precharging the circuits 56 and 57 generate an override signal causing all column lines (both bit and bit/) to be low. This prevents the comparators from draining the charge from the hit lines before the comparison begins.

It should be noted that the comparators examine the "binary one" condition and, in effect, ignore the "binary zero" condition. This is, for instance, if the gate of transistor 64 is high (line 59 high) then transistors 63 and 64 control the comparison. Similarly, if the bit/line 60 is high, then transistors 61 and 62 control the comparison. This feature of the comparator permits cells to be ignored. Thus, when a word is coupled to the CAM, certain bits can be masked from the matching process by making both the bit and bit/line low. This makes it appear that the contents of the cell match the condition on the column lines. This feature is used by the VUDW logic circuit 57.

Microcode signals coupled to logic circuit 57 causes the bit and bit/line for selected ones of the attribute bits to be low as a function of the microcode bits. This results in the attribute associated with that bit to be ignored. This feature is used, for instance, to ignore the U/S bit in the supervisory mode. That is, the supervisory mode can access user data. Similarly, the read/write bit can be ignored when reading or when the supervisory mode is active. The dirty bit is also ignored when reading. (The feature is not used for the valid bit.)

When the attribute bits are stored in main memory, they can be accessed and examined and logic circuits used to control accessing, for instance, based on the one or zero state of the U/S bit. However, when the cache memory no separate logic is used. The forcing of both the bit and bit/lines low, in effect, provides the extra logic by allowing a match (or preventing a fault) even though the bit patterns of the attribute bits are not matched.

The detector from FIG. 6, as shown in FIG. 8, includes a plurality of NOR gates such as gates 81, 82, 83 and 84. Three of the hit lines from the selected set of CAM lines are coupled to gate 81; these are shown as lines A, B, and C. A different combination of the lines are connected to each of the other NOR gates. For instance, NOR gate 84 receives the hit lines D, A, and B. The output of each of the NOR gates is an input to a NAND gate such as NAND gate 86. A hit line provides one input to each NAND gate. This line is the one (of the four A,B,C,D) that is not an input to the NOR gate. This is also the bit line from the set entry to be selected. For example, gate 86 should select the set that is associated with hit line D. For instance, in the case of NOR gate 81, hit line D is coupled to the NAND gate 86. Similarly, for the NAND gate 90, the hit line C in addition to the output of gate 84, are inputs to this gate. An enable read signal is also coupled to the NAND gates to prevent the outputs of this logic from being enabled for a write. The output of the NAND gates, such as line 87, are used to control the multiplexer 55 of FIG. 6. In practice, the signal from the NAND gate, such as the signal on line 87, controls the multiplexer through p-channel transistors. For purposes of explanation, an additional inverter 88 is shown with an output line 89.

The advantage of this detector is that it enables precharge lines to be used in the multiplexer 55. Alternately, a static arrangement could be used, but this would require considerably more power. With the arrangement as shown in FIG. 8, the output from the inverters will remain in the same state until all but of the hit lines drop in potential. When that occurs, only a single output line will drop in potential, permitting the multiplexer to select the correct word.

Thus, a unique address translation unit has been described which uses two levels of memory management, one for segmentation and one for paging. Independent data attribute control (e.g., protection) is provided on each level.

We claim:

1. A method for providing for management of a virtual memory space, said method providing for utilizing of both segmentation and paging techniques, said method comprising the steps of:
    (a) generating virtual address information for addressing said virtual memory space, said virtual address information corresponding to a location in said virtual memory space and containing only information unrelated to paging;
    (b) generating, based on said virtual address information and segment descriptors, said segment descriptors including only information unrelated to paging, intermediate address space information characterized by generation of a linear address identifying a first location in said virtual address space, said first location relocatable within a main memory of said computer system by said paging techniques;
    (c) said paging techniques generating, based on and after generation of said linear address, a physical address having a page information field and an offset field;
    (d) applying said physical address to said main memory over a system bus.

2. A method of providing for memory management in a computer system implementing both segmentation and paging techniques, said method comprising the steps of:
    (a) providing, as inputs to a segmentation process, (i) a virtual address comprising segment descriptor table addressing information and an offset, said virtual address corresponding to a location in a virtual address space, said virtual address containing only information unrelated to paging, and (ii) a segment descriptor table addressable by said segment descriptor table addressing information, said segment descriptor table describing segments without reference to whether a segment is paged or unpaged;
    (b) said segmentation process providing as an output a linear address;
    (c) subsequent to generation of said linear address, alternatively using said linear address as either:
        (i) a first physical address for addressing a main memory; or
        (ii) an input to a paging process for generating said physical address, said paging process generating a second physical address based on a set of inputs including said linear address, said set of inputs consisting essentially of other than said inputs to said segmentation process; and
    (d) applying either said first or second physical address to a main memory over a system bus for accessing said main memory.

3. A method of performing memory management using independent segmentation and paging processes in a virtual memory system having a virtual address space, said virtual address space divisible into segments of any length, each of said segments being defined without reference to whether said segment is paged or unpaged, each of said segments having a base address in said virtual address space, said method comprising the steps of:
    (a) receiving as part of said segmentation process, a virtual address corresponding to a location in said virtual address space, said virtual address corresponding to a location in said virtual address space and containing only information unrelated to said paging process, and combining said segment base address with at least a portion of said virtual address to produce a linear address having at least a page displacement field;
    (b) enabling said paging process separately from said segmentation process so that all segments are treated as paged segments when said paging process is enabled and all segments are treated as unpaged segments when said paging process is not enabled;
    (c) receiving as part of said independently operating paging process, said linear address from said segmentation process;
    (d) generating as part of said paging process, a partial address when said paging process is enabled;
    (e) receiving said linear address and producing a physical address identical to said linear address if said paging process is not enabled or receiving said page displacement field and said partial address and producing a physical address by combining said page displacement field with said partial address if said paging process is enabled; and
    (f) addressing a memory with said physical address produced in step (e).

4. A method of performing memory management in a computer system having a processor and a main memory, said method using independent segmentation and paging processes in translating a virtual address in a virtual address space to a physical address, said method comprising the steps of:

(a) receiving said virtual address, as part of said segmentation process, said virtual address corresponding to a location in said virtual address space and containing only information unrelated to said paging process;

(b) retrieving a segment descriptor, as part of said segmentation process, said segment descriptor providing information describing said segment without reference to whether a segment is paged or unpaged, said segment descriptor comprising at least a segment base address and a segment length;

(c) comparing, as part of said segmentation process, at least a portion of said virtual address to said segment length and generating a fault if said portion of said virtual address exceeds said segment length;

(d) combining, as a part of said segmentation process, said segment base address with said portion of said virtual address to produce a linear address having a page information field and a page displacement field;

(e) receiving, as a part of said independently operating paging process, said linear address from said segmentation process;

(f) retrieving, as part of said paging process, a page entry corresponding to a fixed length page, said page entry identifying a page base address;

(g) producing said physical address corresponding to either (i) said linear address or (ii) said page base address combined with said page displacement field; and (h) accessing said main memory utilizing said physical address.

5. A virtual memory system having a virtual address space, said virtual address space being divisible into segments of any length, said virtual memory system comprising:

(1) a microprocessor device for use in performing memory management using independent segmentation and paging and having an address translation unit, each of said segments being defined without reference to whether said segment is paged or unpaged, each of said segments having a base address in said virtual address space, said address translation unit having;

(a) a segmentation unit for receiving a virtual address corresponding to a location in said virtual address space, said virtual address comprising only information unrelated to paging, said segmentation unit combining said segment base address with at least a portion of said virtual address to produce a linear address having at least a page displacement field;

(b) a paging unit operating independently from said segmentation unit, said paging unit receiving said linear address from said segmentation unit and being enabled separately from said segmentation unit so that all segments are treated as paged segments when said paging unit is enabled and all segments are treated as unpaged segments when said paging unit is not enabled; said paging unit generating a partial address when enabled; and (c) address generating means for either (i) receiving said linear address and producing a physical address identical to said linear address when said paging unit is not enabled or (ii) receiving said page displacement field and said partial address and producing a physical address by combining said page displacement field with said partial address when said paging unit is enabled; and (2) a memory coupled with said address translation unit over a bus for receiving output of said address generating means.

6. A memory management system, comprising:

(a) a microprocessor device for performing memory management using independent segmentation and paging in a virtual memory system, said virtual memory system having a virtual address space that is divisible into segments of any length, said microprocessor device having a plurality of functional areas including an internal memory, and a plurality of address and data terminals, said microprocessor device comprising:

(i) an internal bus for transferring information between said plurality of functional areas;

(ii) a bus interface unit for transferring information between said internal bus and said plurality of address and data terminals;

(iii) an address register for providing virtual memory addresses, each of said virtual memory addresses corresponding to a location in said virtual address space and containing only information that is unrelated to any paging function of said memory management system; and (iv) an address translation unit for receiving said virtual memory addresses from said address register, said address translation unit comprising:

(A) a segmentation unit having at least one segment descriptor register for storing a segment descriptor, said segment descriptor providing information describing said segment without reference to whether a segment is paged or unpaged, said segment descriptor including at least a segment base address and a segment length, said segmentation unit including first circuitry for comparing at least a portion of said virtual address to said segment length and generating a fault if said portion of said virtual address exceeds said segment length, and for combining said segment base address with said portion of said virtual address to produce a linear address having a page information field and a page displacement field; and (B) a paging unit that operates independently from said segmentation unit, said paging unit receiving said linear address, said paging unit comprising:

(1) a page cache for storing a plurality of page entries and tags for said page entries, said page entries representing memory addresses for fixed length pages;

(2) second circuitry for comparing said page information field of said linear address to said tags and, if said page information field matches one of said pages, producing a page entry output corresponding to one of said page entries;

(3) page table addressing circuitry, responsive to said second circuitry, for generating a page table address from a base address on one of said pages of fixed-length and at least a portion of said page information field of said linear address if said page information field does not match any of said pages, said page table addressing circuitry transferring said page table address to said internal bus and receiving a page table entry from said internal bus responsive to said transferring of said page table address to said internal bus; and (C) address generating circuitry for either (i) receiving said linear address and producing a physical address identical to said linear address or (ii) receiving said page displacement field and either said page entry output from said page cache or said page table entry from said page table addressing circuitry and producing a physical address by combining said page displacement field with either said received page entry output of said received page table entry, said address generating circuitry transferring said physical address to said plurality of address and data terminals via said internal bus structure; and (b) an external memory addressable by said plurality of address and data terminals, said external memory containing a plurality of descriptors for transferring to said segment descriptor register.

* * * * *

UNITED STATES PATENT AND TRADEMARK OFFICE
CERTIFICATE OF CORRECTION

PATENT NO. : 5,321,836
DATED : June 14, 1994
INVENTOR(S) : Crawford et al.

It is certified that error appears in the above-indentified patent and that said Letters Patent is hereby corrected as shown below:

In column 1 at line 29 delete "for" and insert --or--

In column 1 at line 47 delete "required" and insert --requires--

In column 1 at line 50 delete "inverted" and insert --invented--

In column 4 at line 2 delete "pars" and insert --parts--

In column 4 at line 58 delete "bas" and insert --base--

In column 4 at line 61 delete "28" and insert --26--

In column 6 at line 33 delete "used" and insert --user--

In column 7 at line 68 delete "coupled" and insert --couples--

In column 8 at line 24 delete "bit" and insert --hit--

In column 8 at line 42 delete "This" and insert --That--

UNITED STATES PATENT AND TRADEMARK OFFICE
CERTIFICATE OF CORRECTION

PATENT NO. : 5,321,836
DATED : June 14, 1994
INVENTOR(S) : Crawford et al.

It is certified that error appears in the above-indentified patent and that said Letters Patent is hereby corrected as shown below:

In column 9 at line 29 delete "of" and insert --to--

In column 9 at line 34 insert --one-- following "but" and prior to "of"

In column 9 at line 45 delete "utilizing" and insert --utilization--

In column 12 at line 61 delete "pages" and insert --tags--

In column 13 at line 2 delete "pages" and insert --tags--

In column 14 at line 4 delete "of" and insert --or--

UNITED STATES PATENT AND TRADEMARK OFFICE
CERTIFICATE OF CORRECTION

PATENT NO. : 5,321,836
DATED : June 14, 1994
INVENTOR(S) : Crawford, et al

It is certified that error appears in the above-indentified patent and that said Letters Patent is hereby corrected as shown below:

In column 14 at line 12 insert --segment-- following "of" and prior to "descriptors"

In column 14 at lines 12-13 delete "transferring" and insert --transfer--

Signed and Sealed this

Sixteenth Day of September, 1997

Attest:

BRUCE LEHMAN

*Attesting Officer*  *Commissioner of Patents and Trademarks*